US009111399B2

(12) United States Patent
McIntee

(10) Patent No.: US 9,111,399 B2
(45) Date of Patent: Aug. 18, 2015

(54) FAILURE RECOVERY MECHANISM FOR ERRORS DETECTED IN A MAIL PROCESSING FACILITY

(75) Inventor: Michael J. McIntee, El Dorado Hills, CA (US)

(73) Assignee: Bell and Howell, LLC, Durham, NC (US)

( * ) Notice: Subject to any disclaimer, the term of this patent is extended or adjusted under 35 U.S.C. 154(b) by 768 days.

(21) Appl. No.: 12/726,601

(22) Filed: Mar. 18, 2010

(65) Prior Publication Data

US 2011/0231008 A1 Sep. 22, 2011

(51) Int. Cl.
*G06F 7/00* (2006.01)
*G07B 17/00* (2006.01)

(52) U.S. Cl.
CPC .... *G07B 17/00459* (2013.01); *G07B 17/00435* (2013.01); *G07B 2017/00491* (2013.01)

(58) Field of Classification Search
USPC .......................................................... 700/224
See application file for complete search history.

(56) References Cited

U.S. PATENT DOCUMENTS 5,419,440 A 5/1995 Picoult
6,073,060 A * 6/2000 Robinson ...................... 700/223
6,243,620 B1 * 6/2001 Robinson et al. ............. 700/223
6,246,925 B1 * 6/2001 Robinson et al. ............. 700/223
6,259,964 B1 * 7/2001 Robinson ...................... 700/224
6,394,346 B1 * 5/2002 Bonneau et al. .............. 235/438
6,661,978 B2 * 12/2003 Brewington .................... 399/19
6,678,067 B1 * 1/2004 Reda et al. ................... 358/1.14
8,125,666 B2 * 2/2012 Mathieson et al. .......... 358/1.15
2001/0000932 A1 * 5/2001 Gunther ....................... 270/1.01
2003/0033053 A1 2/2003 Bodie
2004/0264739 A1 * 12/2004 Das et al. ...................... 382/101
2008/0267510 A1 10/2008 Paul et al.
2009/0159509 A1 * 6/2009 Wojdyla et al. ............... 209/584
2011/0149331 A1 * 6/2011 Duggan et al. ............... 358/1.14

FOREIGN PATENT DOCUMENTS

EP 1 677 259 A2 7/2006

OTHER PUBLICATIONS

European Search Report issued in European Patent Application No. 11158554.3-1229, mailed Jun. 9, 2011.

* cited by examiner

*Primary Examiner* — Gene Crawford
*Assistant Examiner* — Lester Rushin
(74) *Attorney, Agent, or Firm* — Jenkins, Wilson, Taylor & Hunt, P.A.

(57) ABSTRACT

The present application relates to techniques and equipment for printing documents, inspecting the quality of the documents and correcting for defective printed material in a document processing environment. The present techniques and equipment detect one or more defective pages in a document and uniquely identify the defective document. Once the defective document is identified, it can be removed from a document processing system while continuing the document processing run for subsequent documents in a mailing.

15 Claims, 8 Drawing Sheets

Prior
Art

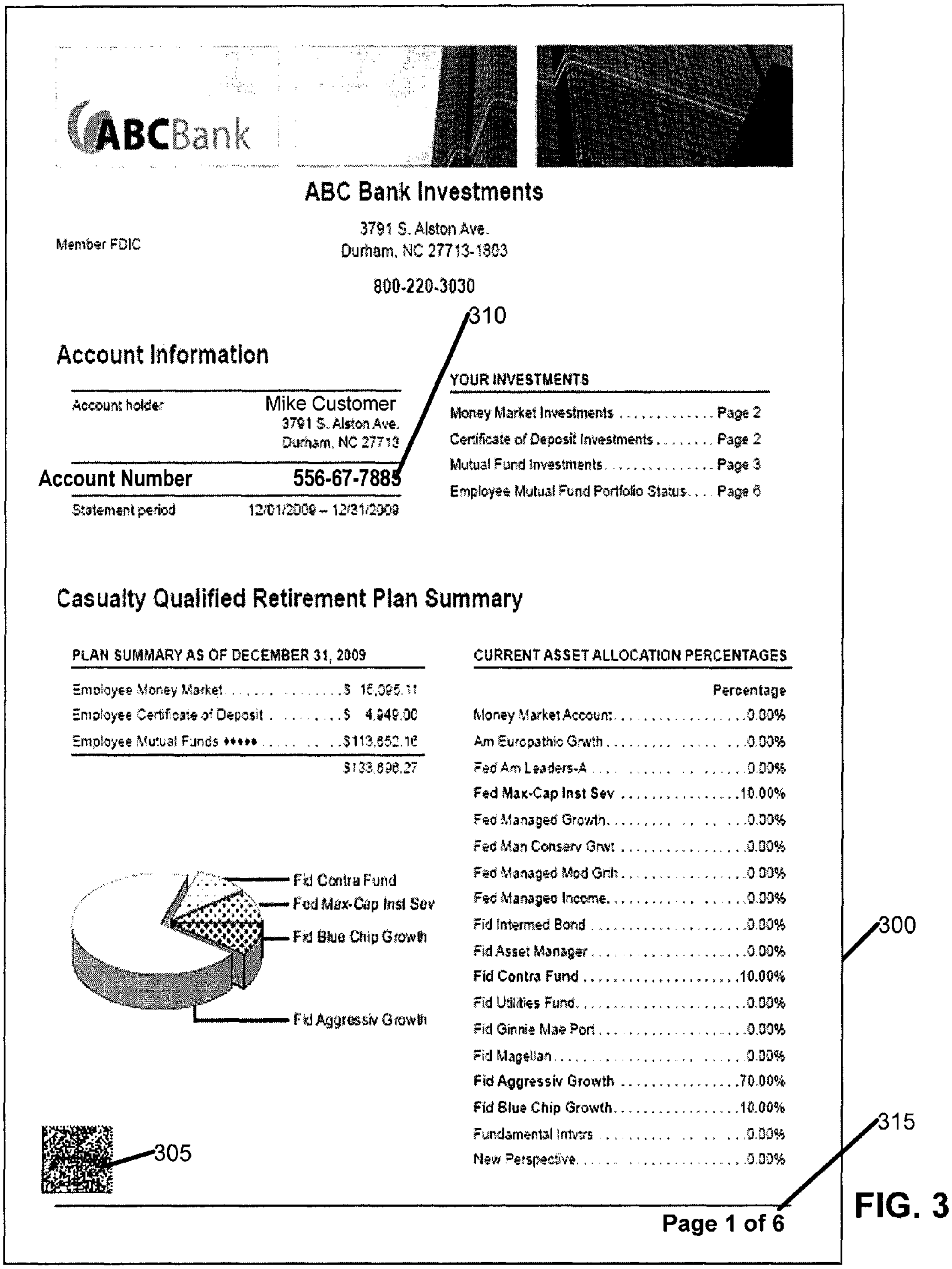

ABCBank

ABC Bank Investments

Member FDIC

3791 S. Alston Ave.
Durham, NC 27713-1803

800-220-3030

310

Account Information

| | |
|---|---|
| Account holder | Mike Customer<br>3791 S. Alston Ave.<br>Durham, NC 27713 |
| **Account Number** | **556-67-7885** |
| Statement period | 12/01/2009 – 12/31/2009 |

YOUR INVESTMENTS

Money Market Investments ............. Page 2
Certificate of Deposit Investments ........ Page 2
Mutual Fund Investments ............... Page 3
Employee Mutual Fund Portfolio Status .... Page 6

Casualty Qualified Retirement Plan Summary

PLAN SUMMARY AS OF DECEMBER 31, 2009

| | |
|---|---|
| Employee Money Market | $ 16,095.11 |
| Employee Certificate of Deposit | $ 4,949.00 |
| Employee Mutual Funds ••••• | $113,852.16 |
| | $133,898.27 |

CURRENT ASSET ALLOCATION PERCENTAGES

| | Percentage |
|---|---|
| Money Market Account | 0.00% |
| Am Europathic Grwth | 0.00% |
| Fed Am Leaders-A | 0.00% |
| **Fed Max-Cap Inst Sev** | **10.00%** |
| Fed Managed Growth | 0.00% |
| Fed Man Conserv Grwt | 0.00% |
| Fed Managed Mod Grth | 0.00% |
| Fed Managed Income | 0.00% |
| Fid Intermed Bond | 0.00% |
| Fid Asset Manager | 0.00% |
| **Fid Contra Fund** | **10.00%** |
| Fid Utilities Fund | 0.00% |
| Fid Ginnie Mae Port | 0.00% |
| Fid Magellan | 0.00% |
| **Fid Aggressiv Growth** | **70.00%** |
| **Fid Blue Chip Growth** | **10.00%** |
| Fundamental Intvrs | 0.00% |
| New Perspective | 0.00% |

305

315

Page 1 of 6

300

FIG. 3

FAILURE RECOVERY MECHANISM FOR ERRORS DETECTED IN A MAIL PROCESSING FACILITY

TECHNICAL FIELD

The present subject matter relates to techniques and equipment to print documents, inspect the quality of the documents and correct for defective printed material in a document processing system.

BACKGROUND

Currently in continuous forms printing, there are three common means of recovering from a detected defect in the printed material. For the first method, the printer is stopped and the defective material is manually removed. This method is undesirable due to the high costs of the recovery since the high speed printer is stopped, the printed paper web 112 has to be cut crosswise and the defective material removed. As illustrated in FIG. 2A, additional pages must be removed since the crosswise cuts 215 and 235 of the printed paper web 112 must be done at a document boundary where no pages of a document extend above and below the cut line. For the example in FIG. 2A, page 2 of document 4 was found to be defective by a print inspection system. Since a re-print of document 4 will likely be scheduled, all 4 pages of document 4 must be removed. The removal of page 4 of document 4 along cut line 235 results in the removal of single page document 5. In addition, if the printed paper web is cut at location 220, page 3 of document 3 is also is removed making document 3 defective. Hence, all of document 3 must be removed by cutting the printed paper web at location 215. Three documents are lost and must be re-printed. Depending on the arrangement of documents on the printed paper web 112, many more documents might have to be removed. Additional problems occur with future document processing operations such as but not limited to roll to roll printing, roll winding and unwinding and operations of inserter or wrapper input channels. In either case, when the break in the printed paper web is processed the document processing system has to be stopped and reloaded. Each stop and reload further reduces production throughput and risks damaging additional document pages. For the reasons mentioned above, this is an expensive and time consuming option.

For the second method, print inspection system allows the defective material to proceed to the winder or fan-folder. Printer systems use marking devices to indicate the zone on the printed paper web or fan folded paper stack where the defect exists. During downstream processes, these zones are removed en masse from the printed material in a manner similar to the first method. The problem with this method is that a considerable amount of material has to be sacrificed to remove a single defect. The third method involves the printer throwing away all or most of the print run and re-printing the job.

Hence a need exists for a print inspection system that can detect a defective page in a document and uniquely identify that page and accompanying pages in the document. The defective document is then flagged for removal by a document processing system without stoppage of the printer, roller or document processing system by removing only the defective document from the production run.

SUMMARY

The teachings herein alleviate one or more of the above noted problems by providing a system and method for detecting one or more defective pages in a document and uniquely identifying the document. Once the defective document is flagged, the present system and method can effectively remove the defective document on a document processing system while continuing the document processing run for subsequent documents in a mailing.

It is desirable to provide a method for using print inspection data to control a document processing system for removing a defective document from a mailing. The method includes receiving a data file at a document processing system controller. The received data file contains at least a unique identifier for each document and an indication whether any document is defective. For one of the documents, its associated unique identifier is read using an image processing device associated with the document processing system. A determination is made to determine if the read unique identifier is associated with a defective document. The defective document is removed from the mailing, while continuously processing subsequent documents in the mailing on the document processing system. A data record is created confirming the removal of the defective document.

It is further desirable to provide a print inspection and defect removal system. The system includes print inspection equipment for capturing an image of a plurality of documents for a mailing. A print inspection processor associates each document with a unique identification and determines if any of the documents is defective. A document processing system controller receives a data file containing at least the unique identifier for each document and an indication whether any document is defective. An image processing device associated with a document processing system reads the unique identifiers for each of the documents. The document processing system is configured to process the plurality of documents and remove any defective document from the mailing, while continuously processing subsequent documents in the mailing.

It is yet further desirable to provide a document finishing system. The system includes document finishing equipment for receiving a printed representation of documents for a mailing. A document finishing controller is in operable connection with the document finishing equipment and the document finishing controller is configured to receive a data file containing at least a unique identifier for each document and an indication whether any of the documents is defective. An image processing device is associated with the document finishing equipment and the image processing device reads the unique identifier for each document. The document finishing equipment is configured to process the documents and remove any defective document from the mailing, while continuously processing subsequent documents in the mailing.

Additional objects, advantages and novel features will be set forth in part in the description which follows, and in part will become apparent to those skilled in the art upon examination of the following and the accompanying drawings or may be learned by production or operation of the examples. The objects and advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 3 is an illustration of a document page with unique identifiers.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Print inspection systems process images of the printed material to evaluate the material at the printing system for a range of defects. Print inspection systems have the native ability to track and report the defective status of a specific print image and associate that status with the identity of the image which is correlated to a page of a document. This data and association is reported to the document factory monitoring system such as the Bowe Bell+Howell BÖWE One system and stored in the system as item data. Using this means of detecting and reporting print defects and storing the information in a central database, the printer can now allow the defective material to proceed to the winder or fan-folder. This maximizes the efficiency of the printing equipment. The printed paper web or fan folded paper is then sent downstream to intelligent document processing equipment as required. Inserters, wrappers and booklet makers are examples of intelligent document finishing systems which manufacture mailpieces. Sorters are another example of intelligent document processing equipment. Each of these document processing systems are equipped with a vision system which includes an image capture and analysis system. The vision system reads unique identifiers on the document pages or mailpieces, identifies each logical page or mailpiece and executes a lookup on the central database to determine if this item has been flagged as defective. If the page or mailpiece has been flagged as defective, the vision system sends the designated commands (in the form of control bits) to the intelligent inserting control system that commands the inserter to selectively divert the material or, alternately, stop or causes the sorter to reject the mailpiece.

The document factory monitoring system allows vision systems to detect, record, and report defects on commercial printers in a manner that allows the printer to continue to run. Since printers generally have no means of precisely removing defective pieces, this new technology allows the printer to access downstream document processing equipment that contains the ability to detect and remove defective pieces. The solution does not create "collateral damage" to non-defective pieces. In other words, the process does not result in removal of pieces that are known to be good.

Figure 1:
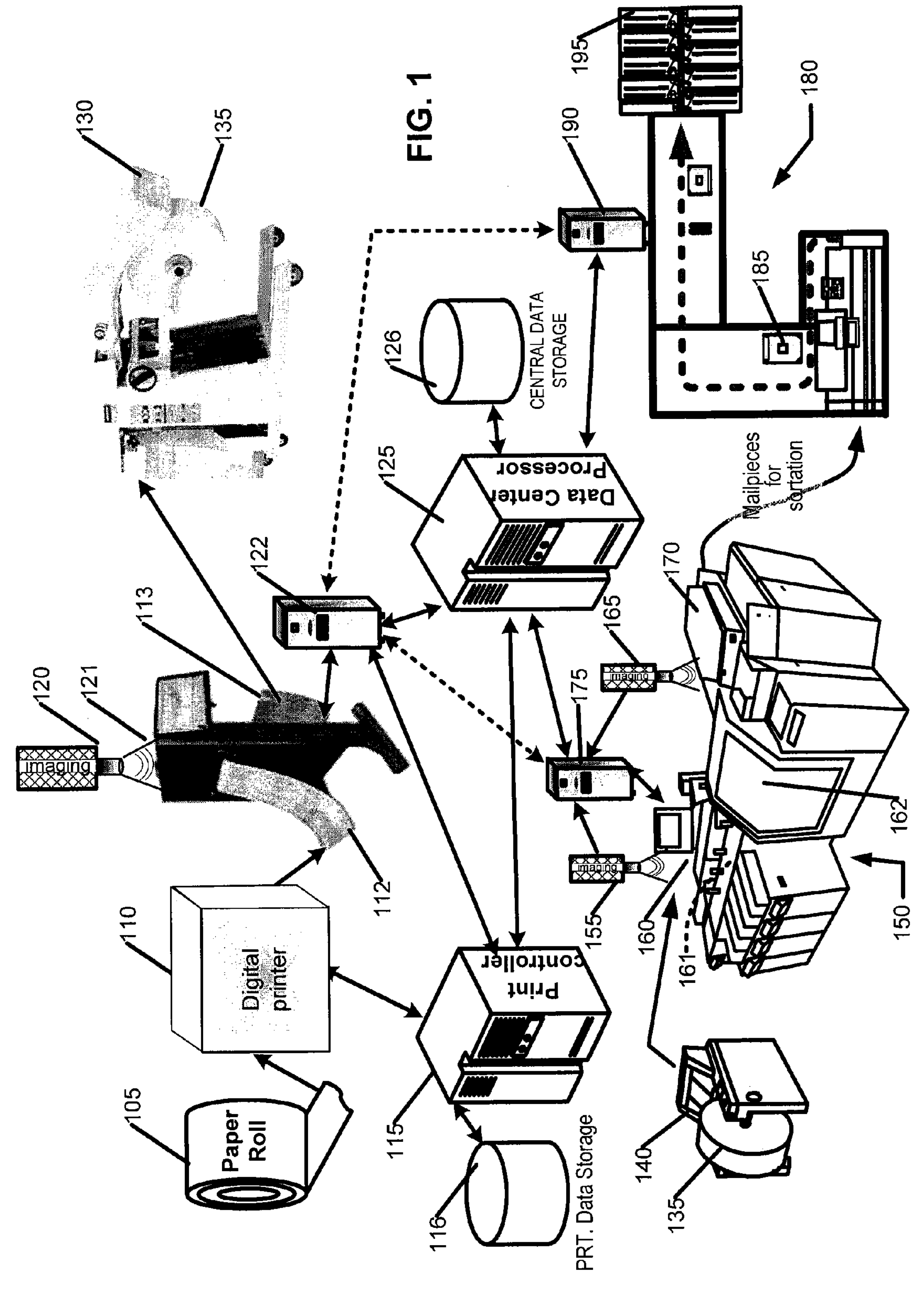
FIG. 1 is an exemplary diagram of the system components of a print inspection and defective document removal system.

Reference now is made in detail to the examples illustrated in the accompanying drawings and discussed below. FIG. 1 illustrates the system components of a print inspection and defective document removal system. The production job starts with a digital printer 110 receiving job instructions from the print controller 115. The job instructions were created in advance of the job run and stored in the print data storage 116 as a print file. A blank roll of paper 105 is loaded onto the digital printer 110 before the job run is started. A stack of fan folded sheets may be used instead of a continuous paper roll. Additional options may include pre-printing some common data on the paper roll to reduce the digital printing cost. The printer output printed paper web 112 is fed to the print inspection system 121 where an image is captured with a imaging system 120. The captured image is transferred to the print inspection computer 122 where the content of each image is compared to the expected content which is derived from the print file data that is provided by the print controller 115. Additional defects are detected such as but not limited to smudges, streaks, ink splatters, color errors and print contrast. Any pages of a document that are defective are flagged for removal and associated with unique identifier(s) on the page for recognition later in the document processing system.

Referring to FIG. 3 for a sample of a document page, the unique identifier on the page 300 maybe a barcode 305 or account number 310. Depending on the print job design, each page of a document maybe marked with a unique identifier or just the first page. Other pages in a document may be identified solely by their page number 315 or by a specially printed unique identifier, for example a barcode. Either the print controller 115 or the data center processor 125 defines the form of the unique identifier (e.g. type of mark or barcode non-limiting examples include an inserter control barcode or postal authority barcode) and alternately the location on the page of the unique identifier to the print inspection computer 122.

Alternately, document fingerprinting may be utilized for document or page identification. Document fingerprinting is defined by the processes that are illustrated in U.S. Pat. App. Pub. No. 2008/0267510, entitled, Document Processing System Control Using Document Feature Analysis for Identification, and which is incorporated by reference in its entirety. The unique identifier examples provided are exemplary in nature and are not intended to limit the features that can be employed by those skilled in the art to uniquely identify a page or document. All of the required unique identifiers are derived from the print file by either the print controller 115 or by the data center processor 125 based on data provided by the print controller 115. In the document fingerprinting case, the unique identifier data is transferred to the print inspection computer 122 before the job run is started or as required during the job run.

Unique identifier data and page status (i.e. good or defective), from the print inspection computer 122 is stored in the central data storage 126 by the data center processor 125. The print inspection system runs in real time. In other words, every page is processed at production speeds without the need to reduce the normal printer throughput. The inspected paper web 113 is rolled on a winder 130 to form a printed paper roll 135, which is ready to be processed on an inserter 150 or wrapper (not shown). An inserter 150 inserts material in an envelope and a wrapper forms the envelope around the material to form the mailpiece. Either document processing system design is compatible with this system even though the figures focus on the operation of an inserter.

Figure 2A:
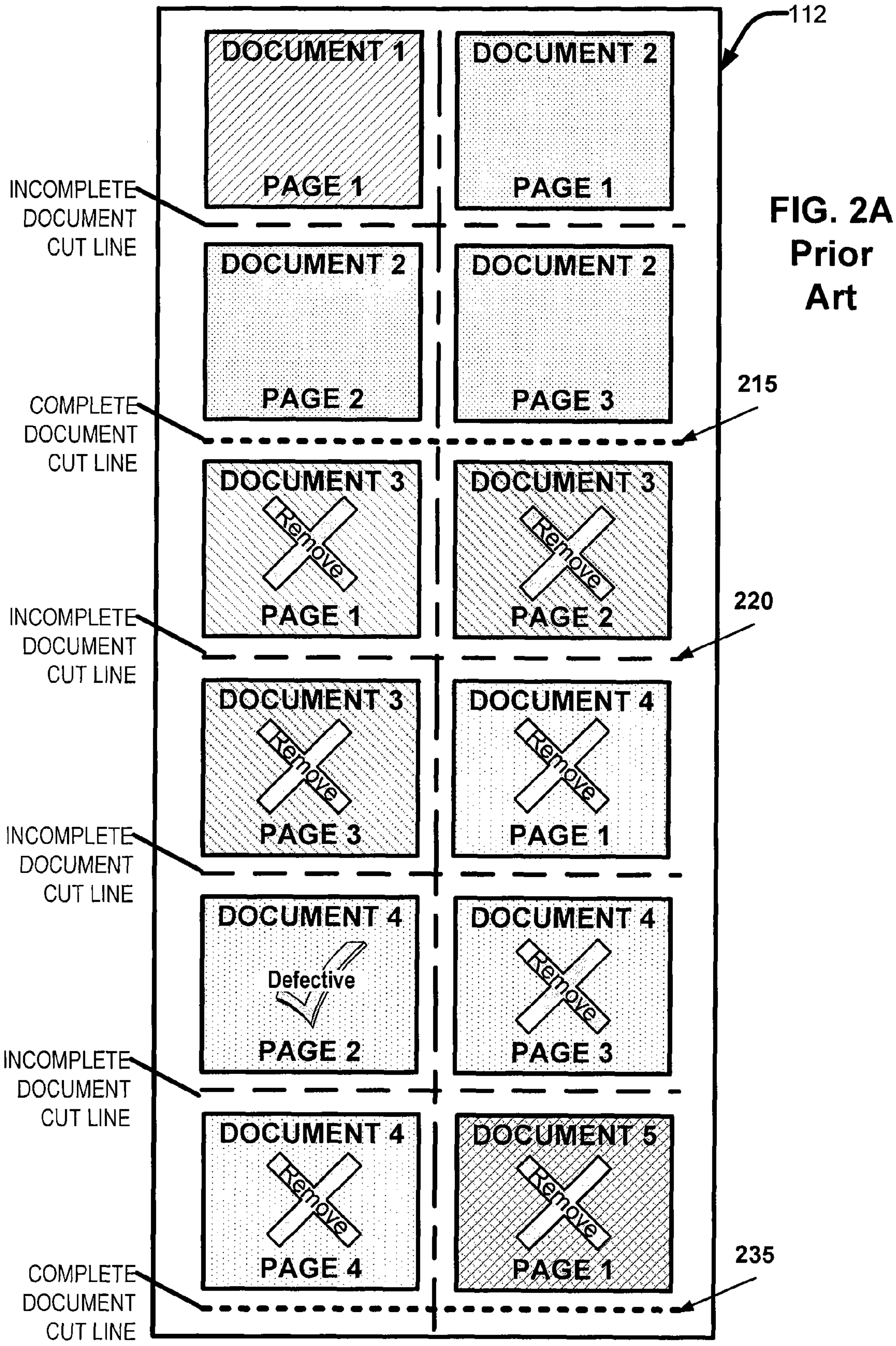
FIG. 2A is a depiction of document pages printed on a printed paper web showing the multiple documents that must be removed for the correction of a single defective page, using prior art technology.
Figure 2B:
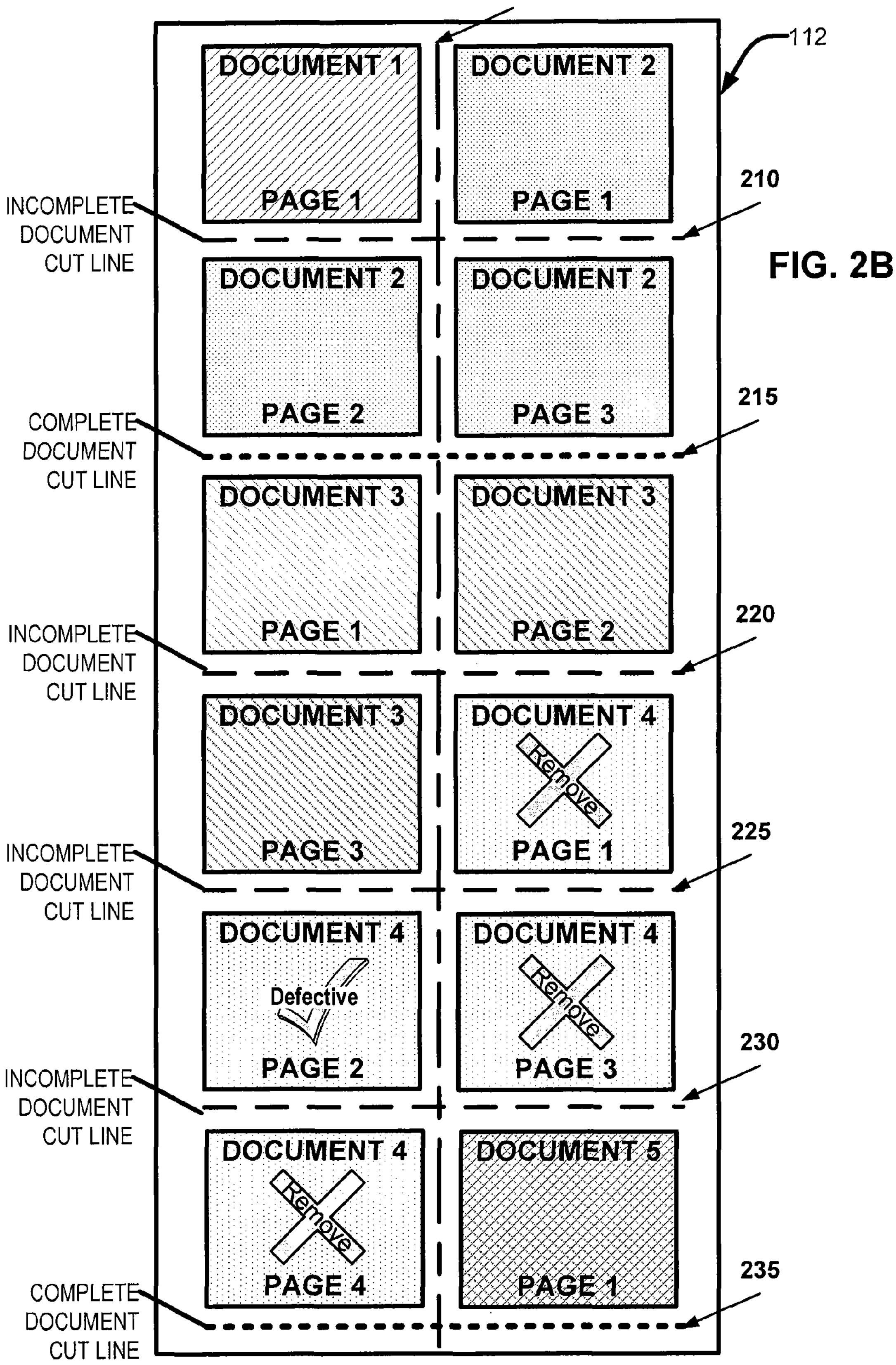
FIG. 2B is a depiction of document pages printed on a printed paper web showing the single document that must be removed for the correction of a single defective page using the present teachings.

The production process continues with printed paper roll 135 being loaded on an unwinder 140 which is attached to the input channel 160 of the inserter 150. The printed paper roll 135 contains both good and defective pages as shown in FIG. 2B. Documents 1, 2, 3 and 5 have been inspected and found to have no defects in any of their pages that warrant the discarding of the document. However, page 2 of document 4 is flagged as defective. Therefore all four pages of document 4 must be discarded. An imaging system 155, positioned in the input channel 160, identifies each document as it enters the input channel 160 using commonly known OCR and barcode processing technology. The document identification is performed by recognizing unique identifiers on the first page or on each page. These unique identification features are based on features obtained by the print inspection system 121. The features needed for unique identification are transferred either directly from the print inspection computer 122 or combined with other data and relayed through the data center processor 125 to the imaging system and inserter control computer 175. FIG. 1 illustrates a single computer 175 used to control the inserter 150 and the two imaging systems 155 and 165. Those skilled in the art may choose to use multiple computers which share the data needed to identify each document and implement the document assembly instructions on the inserter 150. The print inspection system computer 122 also forwards the quality inspection results either directly or through the data center processor 125 to the imagining system and inserter control computer 175. For the example of FIG. 2B, page 2 of document 4 is flagged as defective.

Based on the document assembly instructions for a given document, the inserter input channel 160 cuts the printed paper roll 135 at cut line 210 and then cuts the pair of pages along line 205. The page of document 1 is sent to an accumulator while page 1 of document 2 is held or sent to a different accumulator. The paper roll cut at 215 and 205 allows for the remaining two pages of document 2 to be accumulated and forwarded to the folder and collation track 161. Document 3 requires cuts at 220 and 225 plus 205 which enable pages 1, 2 and 3 to be accumulated, folded and sent to the collation track 161. Page 1 of document 4 is held or sent to a separate accumulator. Cuts 230, 235 and 205 are needed to accumulate the remaining pages of document 4. Even though document 4 is defective, it is folded and advanced to the collation track 161. Document 4 will be tracked along the collation track 161 through the envelope inserter 162 to the output section 170 where it will be diverted from the normal mail stream of quality documents. Alternatively the defective document could be diverted from the collation track 161 before being inserted in an envelope. Document 5 is processed in accordance with the steps above.

Figure 4:
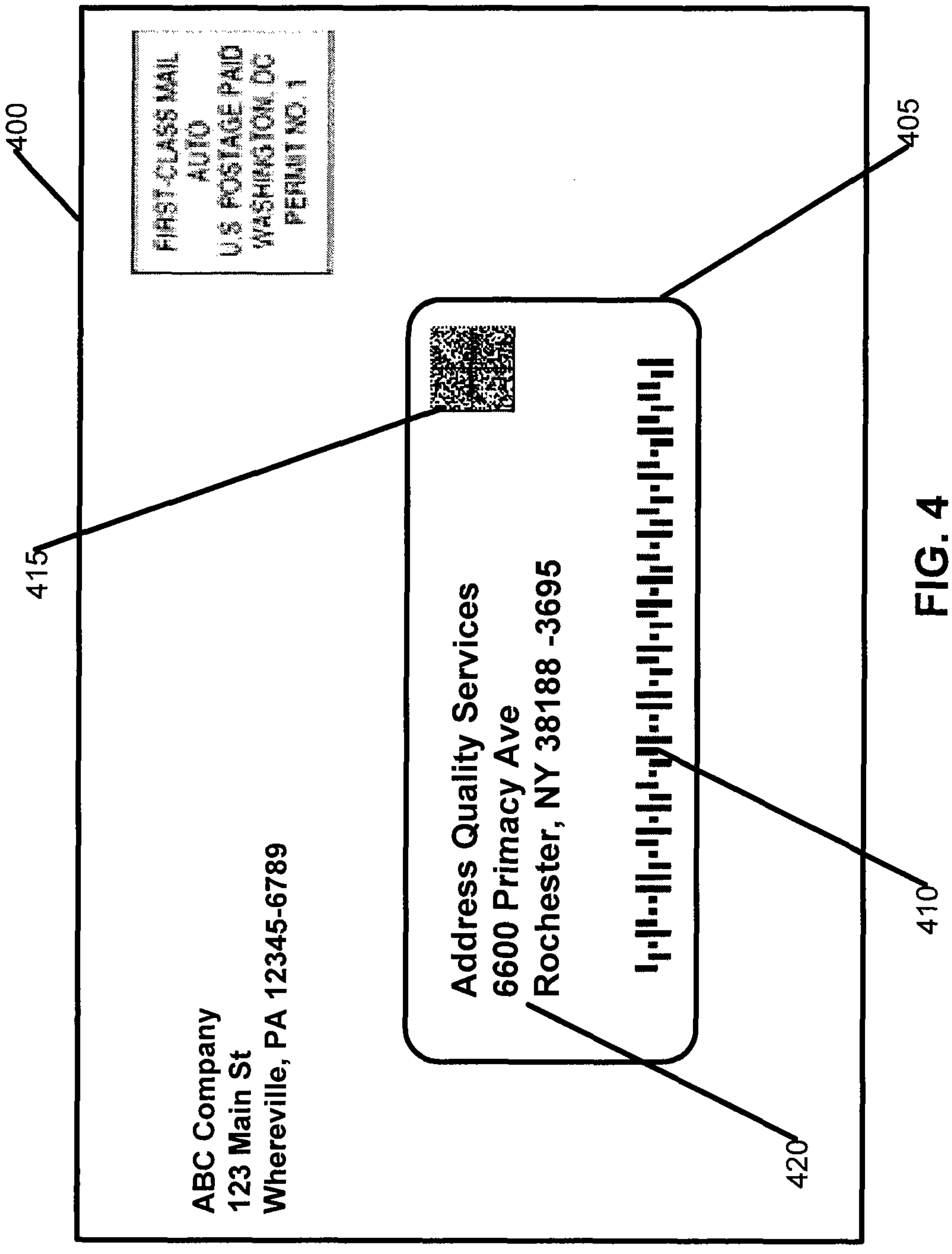
FIG. 4 is an illustration of a envelope with unique identifiers.

If the defective document can not be detected or tracked through the inserter, it can still be identified through features visible on the completed envelope by the imaging system 165 that is attached to the output section 170. FIG. 4 shows exemplary mailpiece envelope 400 which includes a window 405 through which at least an address 420 and delivery point barcode 410 are visible. The current version of a delivery point barcode used by USPS is an Intelligent Mail barcode (IMB) which contains an option to include a unique identifier. An inserter control code 415 also maybe visible through the window. This control code uniquely identifies that mailpiece. All of the data visible through the window 405 is printed on page one of the document and has been recorded and quality verified by the print inspection system 121. For the example of document 4, where the print inspection system 121 has flagged page 2 as defective, the unique identifiers 410 and/or 415 are recorded so that the envelope containing the defective document 4 can be identified in the output system 170. This identification is performed by the imaging system 165 and processed by the imagining system and inserter control computer 175. When the unique identifiers for document 4 are recognized based on data sent from the data center processor 125 or from the print inspection computer 122, the envelope containing document 4 is diverted as being rejected by the output system 170. Those skilled in the art may introduce other unique identifiers that are visible through the window 405 to enable identification of envelopes that contain defective documents.

An additional alternative exists for diverting defective envelopes if the mail from the inserter is going to be processed on a sorter 180 before the mailing production is complete and sent to the postal authority for delivery. Before or during the sorting operation the results of the print inspection, for the mailing being processed, are sent to the sorter control computer 190 from the data center processor 125 or from the print inspection computer 122. This data includes the unique identifier(s) for the envelopes containing defective documents. During sorting operations, the mailpiece sorting imaging system 185 reads the barcodes and the data on the front to the envelope. If the sorter imaging system 185 detects a match between a unique identifier and a defective mailpiece indicator, the mailpiece will be diverted to the reject bin or bins 195.

For all of the methods used to detect and divert defective material, positive feedback is sent to the data center processor 125 to ensure that correct mailing documentation is created for the postal authority. In addition, corrective action maybe initiated at any point in the process such as but not limited to ordering re-prints of the defective document(s).

Figure 5:
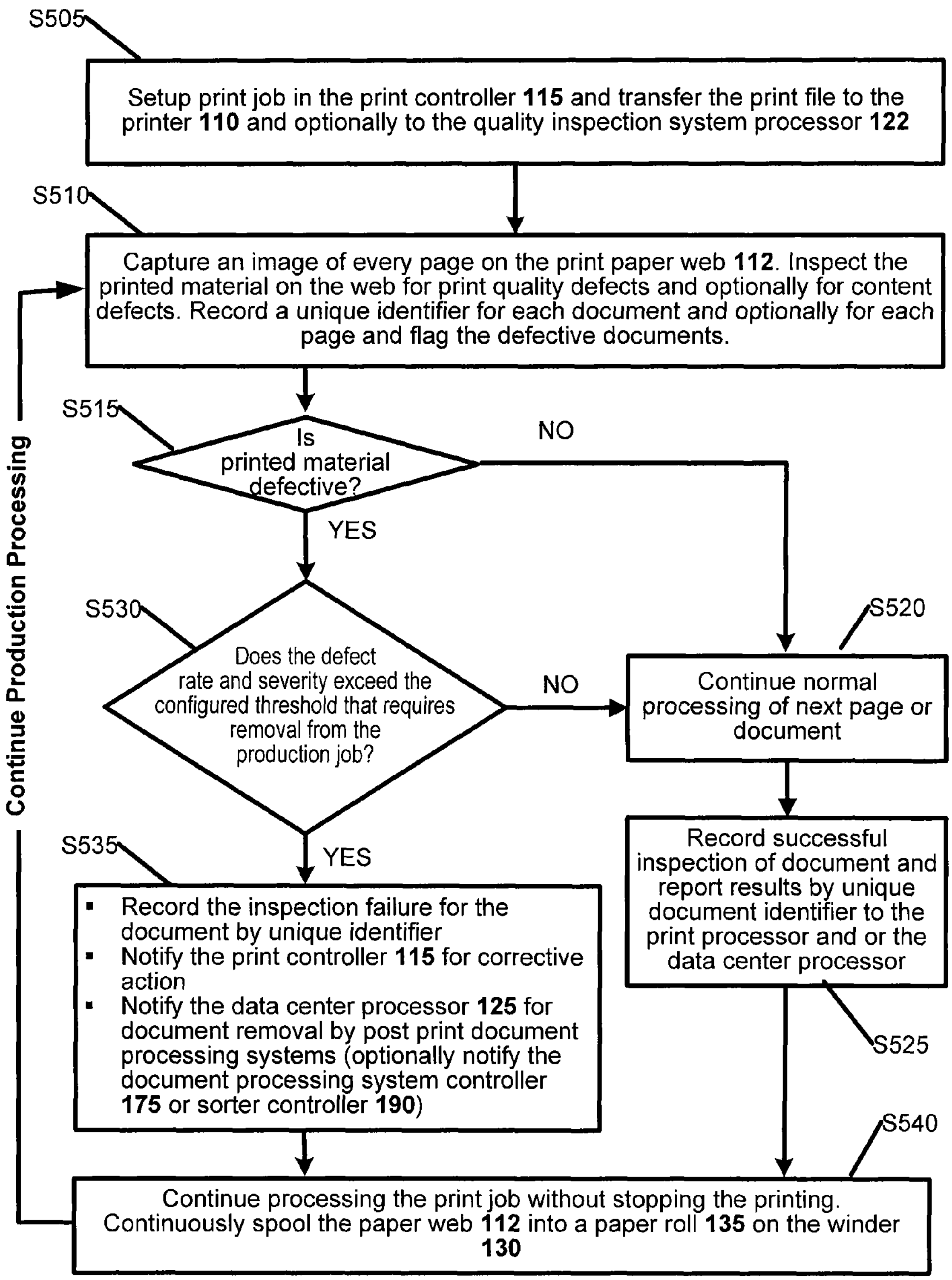
FIG. 5 is an exemplary flow chart of the print inspection process.

Referring to FIG. 5 for an exemplary flow chart of the print inspection process. In step S505, the print job setup is performed by the print controller 115. The print file needed to control the printer 110 is transferred and the same file is sent to the print inspection computer 122 and/or the data center processor 125. The print inspection computer 122 and/or the data center processor 125 will analyze the print file to identify unique identifier(s) and print quality verification requirements. In step S510, the imaging system 120 captures an image of every page printed on the printed paper web 112 and transfers the image to the print inspection computer 122 for analysis. In Step S515, the result of print quality analysis is determined. If all pages in the document pass the quality tests S520, the results of the successful quality inspection along with page and document unique identifiers are transferred to the data center processor 125 for storage 126 in step S525. Continuous processing of the print job continues without stoppage of the printed paper web 112, inspection system processing 121, and transfer of the inspected printed paper web 113 to the winder 130 to form printed paper roll 135, step S540. Normal production processing continues with step S510 until the printing of the electronic print file is complete.

Even though the disclosed process prevents stoppage of the printer, correcting for defects is expensive. Therefore, thresholds are set for the rate and severity of the defects that have to occur before a page or document is flagged as defective. If the defect does not exceed the threshold S530 processing continues with step S520. If the threshold is exceeded S530, the inspection failure is recorded with the setting of a defect flag in the data record for the page and document S535. The defect flag is associated with a unique identifier(s) for the document containing the defective page. If the printer system is configured for reprints, the print controller 115 is notified. The data center processor 125 also is notified of the defective document and corresponding unique identifier(s). Alternately, the print inspection computer can transfer the notification of a defective document and corresponding unique identifier(s) to the inserter system controller 175 or the sorter controller 190 based on the production processing configuration. The data center processor also can schedule a reprint on a different printer if that is the current production configuration. Continuous processing of the print job continues without stoppage of the printed paper web 112, inspection system processing 121, and transfer of the inspected printed paper web 113 to the winder 130 to form printed paper roll 135, step S540. Normal production processing continues with step S510 until the printing of the electronic print file is complete.

Figure 6:
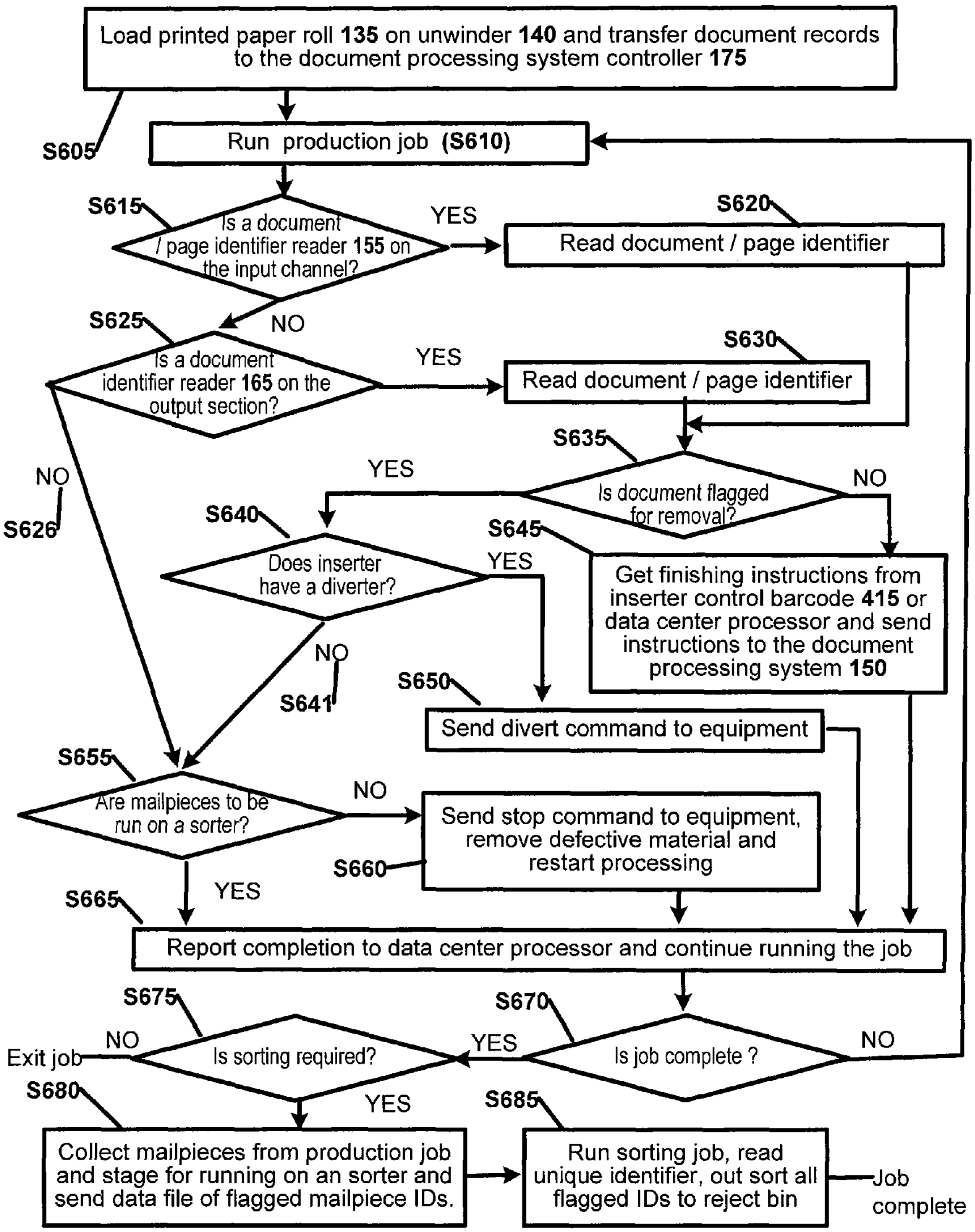
FIG. 6 is an exemplary flow chart of document processing systems used for mailpiece production and for removal of defective material.

Turning now to FIG. 6 for an exemplary flow chart of document processing systems such as, but not limited to, document finishing systems (inserters, wrappers or booklet makers) and sorters, used for mailpiece production and for removal of defective material without stoppage of the insertion or sorting operation. The mail manufacturing process starts with step S605 where the printed paper roll 135 is loaded on the unwinder 140 and the printed paper web 113 is connected to the inserter input channel 160. As part of startup, the print inspection records of defective documents are transferred to the inserter control computer 175 along with inserter control data. The system is now ready to start the production run S610. A series of decisions S615, S625, S640 and S655 are based on the configuration of the inserter system 150 and whether sortation is planned. These steps are not intended as decision steps since the yes/no results do not change during a production run. However, these steps do enable FIG. 6 to represent several system configurations. Step S615 determines if the inserter configuration includes an imaging system 155 on the input channel 160. If there is an imagining system 155, the document unique identifier(s) is read S620 and if the document is not flagged as defective, step 635, the inserter control computer 175 will respond to instructions encoded in the inserter control barcode 415, step S645. Alternately, the inserter control computer 175 may retrieve control instructions from a file or from the data center processor 125. The inserter 150 will assemble the mailpiece in accordance with instructions and will record and report the status of the mailpiece to the data center processor 125, step S665. If the job is not complete S670, the production run continues S610. If the document is flagged as defective S635, the next process depends on whether the inserter is equipped with a collation track 161 or output section 170 diverter S640. If a diverter is present, a divert command is sent to the diverter to remove the defective mailpiece or document, step S650. Steps S665 and S670 are repeated as described above. If an imaging system 165 is included on the output system S625, the unique identifier(s) which are visible through the envelope window are read, step S630. If the document is flagged for removal S635 and the inserter has a diverter S640, the divert command is issued S650. The process continues with steps S665 and S670.

If there are no imaging systems 155 or 165 to read the unique identifier(s) (S615 and S625—NO decision S626) or there are no diverters on the inserter (S640—NO decision S641) a sorting option S655 must exist if the mail production run is to proceed without stoppage(s). If sorter is not to be used, the inserter control system 175 must issue a stop command so that the defective document can be removed manually step S660. If the mailpiece being run is going to be sorted on a sorter 180, step S655, no action is required to identify if the mailpiece contains a defective document. The defective mailpiece will be detected and rejected by the sorter 180. Step S665 sends mailpiece item data to the data center processor 125 and processing continues until all documents are processed S670. When the job is completed S670, it is determined whether sortation is required S675. If no sortation is to be done, the production job is completed and data reports for the postal authority and client are prepared as required by the data center processor 125. When sortation is required, the mailpieces from the production run are collected and transferred to the sorter for sortation. The data files containing at least the unique identifier(s) for the defective mailpieces are transferred to the sorter control computer 190 from either the print inspection computer 122 or from the data center processor 125 if they have not already been sent S680. The next step S685 performs the mailpiece sortation, identifies any mailpieces that contain defective documents and sorts these mailpieces to the reject bin (195 FIG. 1). When the sortation job is completed, the mailpiece processing data is transferred to data center processor 125 where confirmation that all of the defective mailpieces were detected and rejected. Postal authority reports are updated for mail make up and postage accounting due to the removal of the defective mailpieces from the mailing.

As shown by the above discussion, functions relating to the printing, print inspection, mailpiece production and removal of defective material may be implemented on one or more computers operating as the control processors 115, 125 connected for data communication with the processing resource controllers 122, 175, 190 as shown in FIG. 1. Additional processors maybe used by those skilled in the art to process data and control devices are required by the computer architecture design. Although special purpose devices may be used, such devices also may be implemented using one or more hardware platforms intended to represent a general class of data processing device commonly used to run "server" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming; including executable code as well as associated stored data, e.g. files used for the workflow templates for a number of production jobs as well as the various files for tracking data accumulated during one or more productions runs. The software code is executable by the general-purpose computer that functions as the control processor and/or the associated terminal device. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for generating an integrated mailpiece, in essentially the manner performed in the implementations discussed and illustrated herein.

Figure 8:
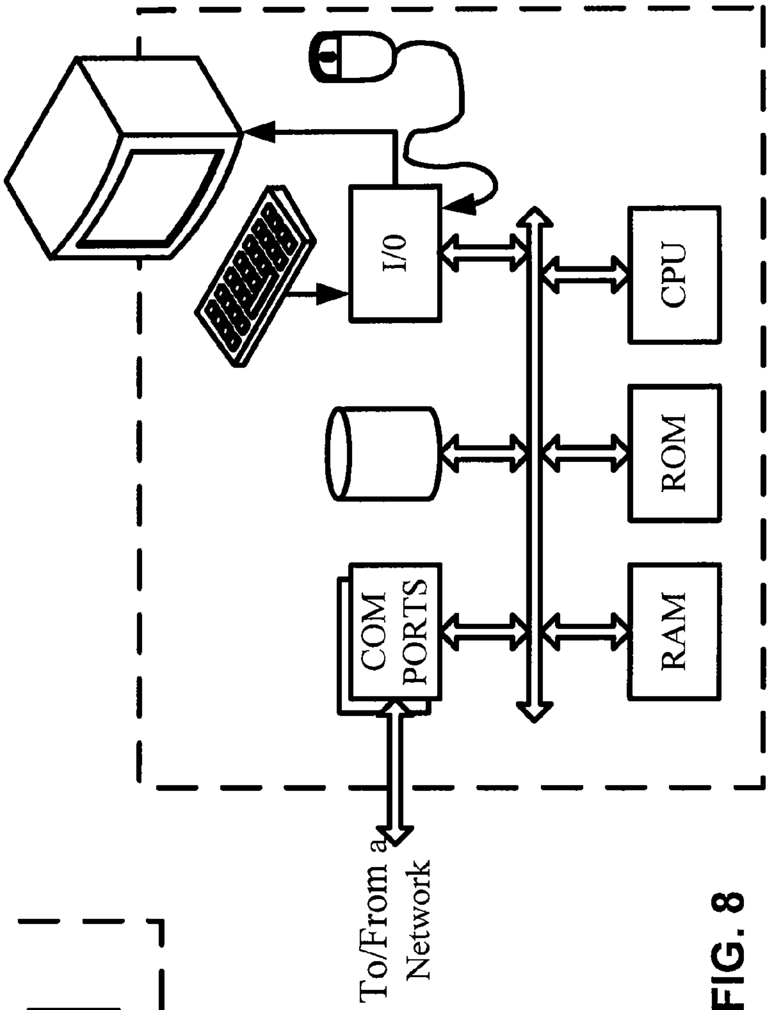
FIG. 8 depicts a computer with user interface elements, as may be used to implement a personal computer or other type of work station or terminal device.
Figure 7:
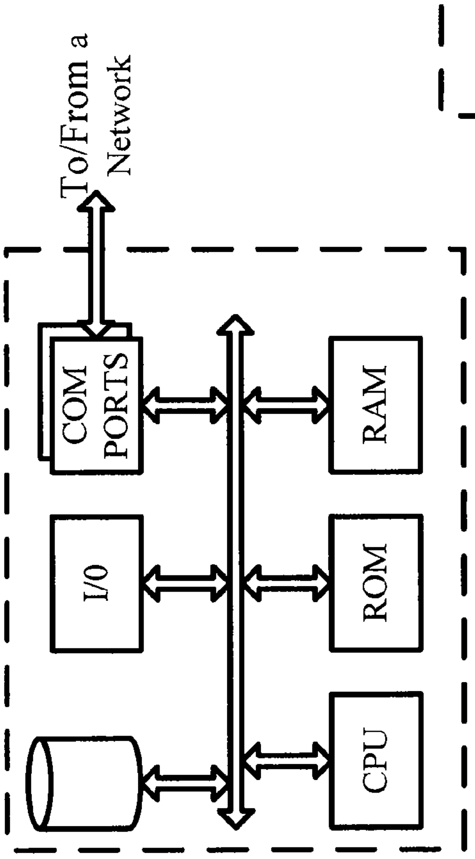
FIG. 7 illustrates a network or host computer platform, as may typically be used to implement a server.

FIGS. 7 and 8 provide functional block diagram illustrations of general purpose computer hardware platforms. FIG. 7 illustrates a network or host computer platform, as may typically be used to implement a server. FIG. 8 depicts a computer with user interface elements, as may be used to implement a personal computer or other type of work station or terminal device, although the computer of FIG. 8 may also act as a server if appropriately programmed. It is believed that those skilled in the art are familiar with the structure, programming and general operation of such computer equipment and, as a result, the drawings should be self-explanatory.

For example, control processor 125 may be a PC based implementation of a central control processing system like that of FIG. 8, or may be implemented on a platform configured as a central or host computer or server like that of FIG. 7. Such a system typically contains a central processing unit (CPU), memories and an interconnect bus. The CPU may contain a single microprocessor (e.g. a Pentium microprocessor), or it may contain a plurality of microprocessors for configuring the CPU as a multi-processor system. The memories include a main memory, such as a dynamic random access memory (DRAM) and cache, as well as a read only memory, such as a PROM, an EPROM, a FLASH-EPROM or the like. The system memories also include one or more mass storage devices such as various disk drives, tape drives, etc.

In operation, the main memory stores at least portions of instructions for execution by the CPU and data for processing in accord with the executed instructions, for example, as uploaded from mass storage. The mass storage may include one or more magnetic disk or tape drives or optical disk drives, for storing data and instructions for use by CPU. For example, at least one mass storage system in the form of a disk drive or tape drive, stores the operating system and various application software as well as data. The mass storage within the computer system may also include one or more drives for various portable media, such as a floppy disk, a compact disc read only memory (CD-ROM), or an integrated circuit non-volatile memory adapter (i.e. PC-MCIA adapter) to input and output data and code to and from the computer system.

The system also includes one or more input/output interfaces for communications, shown by way of example as an interface for data communications with one or more other processing systems. Although not shown, one or more such interfaces may enable communications via a network, e.g., to enable sending and receiving instructions electronically. The physical communication links may be optical, wired, or wireless.

The computer system may further include appropriate input/output ports for interconnection with a display and a keyboard serving as the respective user interface for the processor/controller. For example, a printer control computer may include a graphics subsystem to drive the output display. The output display, for example, may include a cathode ray tube (CRT) display, or a liquid crystal display (LCD) or other type of display device. The input control devices for such an implementation of the system would include the keyboard for inputting alphanumeric and other key information. The input control devices for the system may further include a cursor control device (not shown), such as a mouse, a touchpad, a trackball, stylus, or cursor direction keys. The links of the peripherals to the system may be wired connections or use wireless communications.

The computer system runs a variety of applications programs and stores data, enabling one or more interactions via the user interface provided, and/or over a network to implement the desired processing, in this case, including those for generating an integrated mailpiece, as discussed above.

The components contained in the computer system are those typically found in general purpose computer systems. Although summarized in the discussion above mainly as a PC type implementation, those skilled in the art will recognize that the class of applicable computer systems also encompasses systems used as host computers, servers, workstations, network terminals, and the like. In fact, these components are intended to represent a broad category of such computer components that are well known in the art. The present examples are not limited to any one network or computing infrastructure model—i.e., peer-to-peer, client server, distributed, etc.

Hence aspects of the techniques discussed herein encompass hardware and programmed equipment for controlling the relevant document processing as well as software programming, for controlling the relevant functions. A software or program product, which may be referred to as a “program article of manufacture” may take the form of code or executable instructions for causing a computer or other programmable equipment to perform the relevant data processing steps regarding the manufacturing of an integrated mailpiece, where the code or instructions are carried by or otherwise embodied in a medium readable by a computer or other machine. Instructions or code for implementing such operations may be in the form of computer instruction in any form (e.g., source code, object code, interpreted code, etc.) stored in or carried by any readable medium.

Such a program article or product therefore takes the form of executable code and/or associated data that is carried on or embodied in a type of machine readable medium. “Storage” type media include any or all of the memory of the computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the relevant software from one computer or processor into another, for example, from a management server or host computer into the image processor and comparator. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible “storage” media, terms such as computer or machine “readable medium” refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for using print inspection data associated with a roll of paper containing a plurality of printed documents, to control an inserter or wrapper system for removing a defective document contained in an envelope from a mailing, the method comprising steps of:

receiving a data file associated with the roll of paper containing the printed documents at a system controller of the inserter or wrapper system, the received data file containing at least a unique identifier and a print defect indicator linked to the unique identifier for each of a plurality of documents and an indication whether any of the documents is defective in terms of at least print defects generated during printing operations of the document;

for one of the plurality of documents, reading the unique identifier printed in an area of the document that is visible through an envelope window following insertion with an image processing device positioned adjacent to an input or output channel of the inserter or wrapper system;

determining if the read unique identifier is associated with the defective document in terms of at least the print defects;

upon the determination:

diverting an envelope containing a printed version of the defective document on inserter or wrapper system by way of a diverter that is present on the inserter or wrapper system, while continuously processing subsequent documents in the mailing on the inserter or wrapper system; or processing an envelope containing a printed version of the defective document on the inserter or wrapper system when no diverter is present on the inserter or wrapper system and subsequently diverting to a reject bin the envelope containing the printed version of the defective document on a sorter system; and creating a data record confirming the removal of the defective document.

2. The method according to claim 1, wherein the unique identifier is selected from or contained within a barcode, printed characters or a document fingerprint.

3. The method according to claim 1, wherein the print inspection system comprises an imaging system and at least one of a barcode reader, optical character recognition (OCR) or fingerprint identifier.

4. A method for using print inspection data to control a sorter, inserter or wrapper system for removing a defective document contained in an envelope from a mailing, the method comprising steps of:

receiving a data file at a system controller of the inserter or wrapper system, the received data file containing at least a unique identifier and a print defect indicator linked to the unique identifier for each of a plurality of documents associated with a roll of paper containing the printed documents and an indication whether any envelope contains a defective document in terms of at least a print quality defect generated during printing operations of the document;

for one of the plurality of envelopes containing documents, reading the unique identifier visible through an envelope window using an image processing device positioned adjacent to a document transport path of a sorter system;

determining if the read unique identifier contained within the data file is associated with an envelope containing a defective document in terms of at least the print quality defect;

sorting the envelope containing the defective document to a reject bin associated with the sorter system, while continuously processing subsequent documents in the mailing on the sorter system; and creating a data record confirming the removal of the defective document.

5. The method according to claim 1, wherein the receiving step includes: receiving the data file generated by a print inspection system.

6. The method according to claim 1, wherein the receiving step includes:

receiving the data file generated by a central data processor.

7. A print inspection and defect removal system comprising:

print inspection equipment positioned on an output of a printer for capturing an image of a plurality of documents printed on a roll of paper to be processed by an inserter or wrapper system for producing mailpieces contained in a mailing;

a print inspection processor for associating each of the plurality of documents with the unique identifier and associating the unique identifier with a print defect in any of the document pages without stopping the printer;

a controller of the inserter or wrapper system for receiving a data file containing at least the unique identifier for each of the plurality of documents and the print defect indicator associated with the unique identifier for any document in terms of at least a print defect generated during printing operations of the document;

an image processing device positioned adjacent to an input or output channel of the inserter or wrapper system for reading the plurality of unique identifiers printed in an area of the document that is visible through an envelope window following insertion for each of the plurality of documents, wherein:

the inserter or wrapper system is configured to process the plurality of documents into a plurality of envelopes and remove any envelope containing a defective document in terms of at least the print quality defect from the mailing, while continuously processing subsequent documents in the mailing, wherein:

the inserter or wrapper system including a diverter for diverting the envelope containing the defective document from the mailing, while continuously processing subsequent documents in the mailing on the inserter or wrapper system.

8. The system according to claim 7, wherein the unique identifier is selected from or contained within a barcode, printed characters or a document fingerprint.

9. The system according to claim 7, wherein the print inspection system comprises an imaging system and at least one of a barcode reader, optical character recognition (OCR) or fingerprint identifier.

10. The system according to claim 7, wherein the document processing system controller receives the data file generated by the print inspection processor.

11. The system according to claim 7, further comprising:

a central data processor, wherein the document processing system controller receives the data file from the central data processor.

12. A document finishing system comprising:

document finishing equipment selected from an inserter or wrapper, for receiving a printed representation of a plurality of documents contained on a roll of paper to be processed by a document finishing inserter or wrapper system for producing mailpieces contained in a mailing;

a document finishing controller in operable connection with the document finishing equipment, the document finishing controller configured to receive a data file containing at least a unique identifier linked to a print defect indicator for each of the plurality of documents and an indication whether any of the documents is defective in terms of at least a print defect generated during printing operations of the document;

an image processing device positioned adjacent to an input or output channel of the document finishing equipment for reading the plurality of unique identifiers printed in an area of the document that is visible through an envelope window following insertion for each of the plurality of documents, wherein:

the document finishing equipment is configured to process the plurality of documents based on the received data file and remove any defective document having the print quality defect and contained within an envelope, from the mailing by way of a diverter, while continuously processing subsequent documents in the mailing.

13. The system according to claim 12, wherein the unique identifier is selected from or contained within a barcode, printed characters or a document fingerprint.

14. The method according to claim 1, wherein the reading step includes:

reading the one document with the image processing device positioned adjacent to a document transport path on the sorter.

15. The system according to claim 7, wherein the image processing device, positioned adjacent to a document transport path on the sorter, reads at least the one document unique identifier.

* * * * *